(12) United States Patent
Petersen

(10) Patent No.: US 11,742,667 B2
(45) Date of Patent: Aug. 29, 2023

(54) INTEGRATED HYBRID POWER PLANTS FOR OFF-GRID SYSTEMS

(71) Applicant: VESTAS WIND SYSTEMS A/S, Aarhus N (DK)

(72) Inventor: Lennart Petersen, Aalborg (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 9 days.

(21) Appl. No.: 17/052,710

(22) PCT Filed: Apr. 26, 2019

(86) PCT No.: PCT/DK2019/050127
§ 371 (c)(1),
(2) Date: Nov. 3, 2020

(87) PCT Pub. No.: WO2019/210920
PCT Pub. Date: Nov. 7, 2019

(65) Prior Publication Data
US 2021/0242686 A1   Aug. 5, 2021

(30) Foreign Application Priority Data
May 3, 2018   (DK) .......................... PA 2018 70265

(51) Int. Cl.
*H02J 3/38* (2006.01)
*H02J 3/32* (2006.01)

(52) U.S. Cl.
CPC ............... *H02J 3/381* (2013.01); *H02J 3/32* (2013.01); *H02J 2203/20* (2020.01);
(Continued)

(58) Field of Classification Search
CPC .......... H02J 3/381; H02J 3/32; H02J 2203/20; H02J 2300/10; H02J 2300/24;
(Continued)

(56) References Cited

U.S. PATENT DOCUMENTS 9,847,648 B2 * 12/2017 Shelton ................... H02J 3/381
2011/0204845 A1 * 8/2011 Paparo .................... H01F 38/14
320/108

(Continued)

FOREIGN PATENT DOCUMENTS

CN   107294120 A   10/2017
CN   107947178 A   4/2018

(Continued)

OTHER PUBLICATIONS

Danish Patent and Trademark Office 1st Technical Examination for Application No. PA 2018 70265 dated Oct. 23, 2018.
(Continued)

*Primary Examiner* — Ziaul Karim
(74) *Attorney, Agent, or Firm* — Patterson + Sheridan, LLP

(57) ABSTRACT

The present invention relates to a hybrid power plant comprising a plurality of power units being operatively connected to an internal power grid, wherein the power ratings of the plurality of power units of the hybrid power plant are determined in accordance with active and reactive power losses in the internal power grid in order to obtain optimal and cost efficient operation of the hybrid power plant. The present invention also relates to a method for determining the power ratings of a plurality of power units being operatively connected to an internal power grid of such a hybrid power plant.

18 Claims, 16 Drawing Sheets

(52) U.S. Cl.
CPC ....... *H02J 2300/10* (2020.01); *H02J 2300/24* (2020.01); *H02J 2300/28* (2020.01)

(58) Field of Classification Search
CPC ... H02J 2300/28; H02J 2300/40; Y02E 10/56; Y02E 40/70; Y02E 60/00; Y02P 80/20; Y04S 10/50; Y04S 40/20
See application file for complete search history.

(56) References Cited

U.S. PATENT DOCUMENTS

| | | | | |
|---|---|---|---|---|
| 2015/0083393 | A1* | 3/2015 | Ferrari | H02J 3/38 166/105 |
| 2016/0204480 | A1* | 7/2016 | Triebel | H01M 10/425 429/50 |
| 2017/0003700 | A1* | 1/2017 | Pavlovski | H02J 3/003 |
| 2017/0235322 | A1 | 8/2017 | Rahman et al. | |
| 2019/0280640 | A1* | 9/2019 | Ganireddy | H02J 3/50 |

FOREIGN PATENT DOCUMENTS

| | | |
|---|---|---|
| EP | 1508951 A1 | 2/2005 |
| EP | 1933441 A1 | 6/2008 |
| EP | 2108828 A2 | 10/2009 |
| EP | 2175540 A2 | 4/2010 |
| EP | 2315333 A2 | 4/2011 |
| KR | 101786904 B1 | 11/2017 |
| WO | 2014201849 A1 | 12/2014 |
| WO | 2019210920 A1 | 11/2019 |

OTHER PUBLICATIONS

PCT Notification of Transmittal of the International Search Report and the Written Opinion of the International Searching Authority, or the Declaration for Application No. PCT/DK2019/050127 dated Jul. 5, 2019.

H. Lan et al., "Modeling Analysis and Improvement of Power Loss in Microgrid," Mathematical Problems in Enginnering, vol. 2015, Jan. 1, 2015, pp. 1-8.

H. Hassanzadehfard et al: "Optimal Sizing of an Islanded Micro-Grid for an Area in North-West Iran Using Particle Swarm Optimization Based on Reliability Concept", Proceedings of the 48th Scandinavian Conference on Simulation and Modeling (SIMS 2007), vol. 57, Nov. 3, 2011 (Nov. 3, 2011), pp. 2969-2976.

Qiang Fu et al: "Microgrid Generation Capacity Design With Renewables and Energy Storage Addressing Power Quality and Surety", IEEE Transactions on Smart Grid, vol. 3, No. 4, Dec. 1, 2012 (Dec. 1, 2012), pp. 2019-2027.

European Patent Office, Communication pursuant to Article 94(3) EPC for Application 19 721 984.3-1202, dated May 9, 2023.

\* cited by examiner

INTEGRATED HYBRID POWER PLANTS FOR OFF-GRID SYSTEMS

FIELD OF THE INVENTION

The present invention relates to a system configuration of off-grid hybrid power plants. More specifically, the present invention relates to a method in which it is possible to determine the optimal sizes of the energy resources in a hybrid power plant such that an optimal and cost efficient operation of the hybrid power plant is obtained.

BACKGROUND OF THE INVENTION

Hybrid power plants comprise one or more different energy resources. The energy resources may be in the form of renewable energy resources, such as wind turbine generators and/or photovoltaic systems. The energy resources may also be in the form of non-renewable energy resources, such as diesel driven generators. Furthermore, battery energy storage system may be integrated as a part of the hybrid power plant in order to ensure stability in the system.

In a global perspective particularly in emerging and frontier markets, a significant trend is to be expected towards distributed energy systems to ensure rural electrification. This means that the traditional power system structure (bulk generation→transmission→distribution→consumption) moves away towards a distributed cellular architecture, where a number of small-scale micro-grids are collecting power from a number of distributed generation assets and providing power for local consumers. These so-called off-grid systems can be preferred for instance due to geographic reasons in remote locations (islands, regions with low population density, secluded industrial sites) or for political, commercial or social reasons. The key advantage of off-grid systems is that power is produced closer to the consumption premises to prevent investments in the electricity transmission systems.

Traditionally, the power generation in off-grid systems has been based on fossil-fueled production systems (i.e. diesel generators) which need to account for logistics, storage and availability of fuels in remote areas. However, it is shown in many studies that the most cost effective approach for providing energy is to combine multiple distributed energy resources (DERs), e.g. wind turbine generators (WTGs), photovoltaic systems (PVs), battery energy storage systems (BESSs) etc.

One of the most important aspects for so-called off-grid hybrid power plants (HPPs) is the configuration architecture. It determines the system topology and location, installed capacity and generic system management strategies according to the estimated power demand and the desired security of supply level. The majority of research activities in this area have focused on techno-economic analyses using state-of-the-art commercial software (e.g. HOMER Pro®) in order to determine the optimal sizing of an off-grid HPP, based on a given load demand profile on site with a specific system topology. However, none of the studies have focused on a modular and scalable approach for configuring a HPP with wind power and other DERs.

The state-of-the-art method is to perform the techno-economic analysis by using hourly mean values of load demand and renewable resource data (wind speed and solar irradiation). It has not been investigated yet, how accurate a system configuration can be determined based on hourly mean values due to the potential necessity of operational reserve. This is due to the intra-hour power variations caused by wind speed fluctuations, varying load demand as well as cloud effects in the solar irradiation.

The majority of studies perform a pure energy analysis by representing active power generation vs. demand. Another important aspect is the supply of reactive power demand to the demand subsystem, which has an effect on the plant configuration according to the studies in due to limited reactive power capacities of the individual DERs. This feature is not available in commercial software solutions, mostly due to the omission of the system electrical infrastructure.

It may be seen as an object of embodiments of the present invention to provide a methodology to determine feasible system configurations of modular and scalable wind integrated HPP solutions for off-grid applications.

It may be seen as a further object of embodiments of the present invention to provide a robust sizing method with respect to the required resolution of resource data in order to account for intra-hour power variations.

It may be seen as an even further object of embodiments of the present invention to provide a methodology where an involvement of the electrical infrastructure enables a precise estimation of power losses within the HPP as well as the consideration of both active and reactive power load demand for optimally sizing the HPP components.

DESCRIPTION OF THE INVENTION

The above-mentioned objects are complied with by providing, in a first aspect, a hybrid power plant comprising a plurality of power units being operatively connected to an internal power grid, wherein the power ratings of the plurality of power units of the hybrid power plant are determined in accordance with active and reactive power losses in the internal power grid in order to obtain optimal operation of the hybrid power plant. In the present context the term power rating should be understood as the rated power or nominal power of the plurality of power units. Moreover, the term optimal operation of the HPP should be understood as optimal sizing of the HPP in terms of power capability, i.e. the capability of the HPP to generate and deliver active power and/or reactive power. The sizing of the HPP should thus be understood as sizing of the plurality of power units of the HPP in relation to their power generation capabilities.

HPPs are advantageous from a cost perspective in that they combine multiple DERs, such as WTGs, PVs, BESSs, engine driven generators (gensets) etc. being operatively connected to the internal power grid. The internal power grid may be connected to a point of common coupling (PCC) for further distribution. Moreover, the HPP according to the first aspect may be an off-grid HPP. Off-grid HPPs are advantageous in that power is produced closer to the consumption premises to prevent investments in the electricity transmission systems.

The internal power grid of the HPP may comprise a first voltage bus and a second voltage bus. The first voltage bus may comprise a low-voltage bus. The second voltage bus may comprise a medium-voltage bus. The medium-voltage bus may be operatively connected to the low-voltage bus via one or more transformer units. The voltage level of the low-voltage bus may be in the range <1 kV, whereas the voltage level of the medium-voltage bus may be in the range 1-35 kV.

One or more renewable energy sources, such as one or more WTGs and/or one or more PVs, may be positioned at remote locations relative to other power units of the HPP. In this case one or more WTGs and/or one or more PVs may be operatively connected to one or more medium-voltage buses via respective transformer units in order to reduce power losses. While one or more WTGs and/or one or more PVs may be operatively connected to one or more medium-voltage buses, one or more BESSs and/or one or more gensets may be operationally connected to one or more low-voltage buses and/or one or more medium-voltage buses.

The total power rating of the plurality of power units of the HPP may be below 5 MW, such as below 4 MW, such as below 3 MW, such as below 2 MW, such as below 1.5 MW, such as below 1 MW. It should be noted however that the total power rating of the plurality of power units of the HPP may also be in the multi-MW range.

In a second aspect the present invention relates to a method for determining the power ratings of a plurality of power units being operatively connected to an internal power grid of a hybrid power plant, the method comprising the steps of determining the power ratings of the plurality of power unit in accordance with active and reactive power losses in the internal power grid in order to obtain optimal operation of the hybrid power plant.

Similar to the first aspect of the present invention the internal power grid may comprise a first voltage bus and a second voltage bus, wherein the first voltage bus may comprise a low-voltage bus, and wherein the second voltage bus may comprise a medium-voltage bus. The medium-voltage bus may be operatively connected to the low-voltage bus via one or more transformer units.

The method according to the second aspect may be applicable for determining the power ratings of a plurality of power units of for example an off-grid HPP comprising a plurality of DERs, such as WTGs, PVs, BESSs and/or engine driven generators (gensets) being operatively connected to the internal power grid. Again, the term power rating should, in the present context, be understood as the rated power or nominal power of the plurality of power units. Thus, the rated or nominal power of a power unit is the maximum power output that the power unit can sustain over an extended period under ideal condition e.g. for a WTG when the wind is sufficiently high and for a PV when the insolation is high enough. Moreover, the term optimal operation of the HPP should be understood as optimal sizing of the HPP in terms of power capability, i.e. the capability of the HPP to generate and deliver active power and/or reactive power. The sizing of the HPP should thus be understood as sizing of the plurality of power units of the HPP in relation to their power generation capabilities. The internal power grid may be connected to a point of common coupling (PCC) for further distribution.

One or more renewable energy sources, such as one or more WTGs and/or one or more PVs, may be positioned at remote locations relative to other power units of the HPP. In this case one or more WTGs and/or one or more PVs may be operatively connected to one or more medium-voltage buses via respective transformer units in order to reduce power losses. While one or more WTGs and/or one or more PVs may be operatively connected to one or more medium-voltage buses, one or more BESSs and/or one or more gensets may be operationally connected to one or more low-voltage buses and/or one or more medium-voltage buses.

The total power rating of the plurality of power units of the HPP may be below 5 MW, such as below 4 MW, such as below 3 MW, such as below 2 MW, such as below 1.5 MW, such as below 1 MW. It should be noted however that the principle underlying the present invention is also applicable in relation to multi-MW HPPs.

In general the various aspects of the present invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

The present invention will now be described in further details with reference to the accompanying drawings, wherein.

Figure 1:
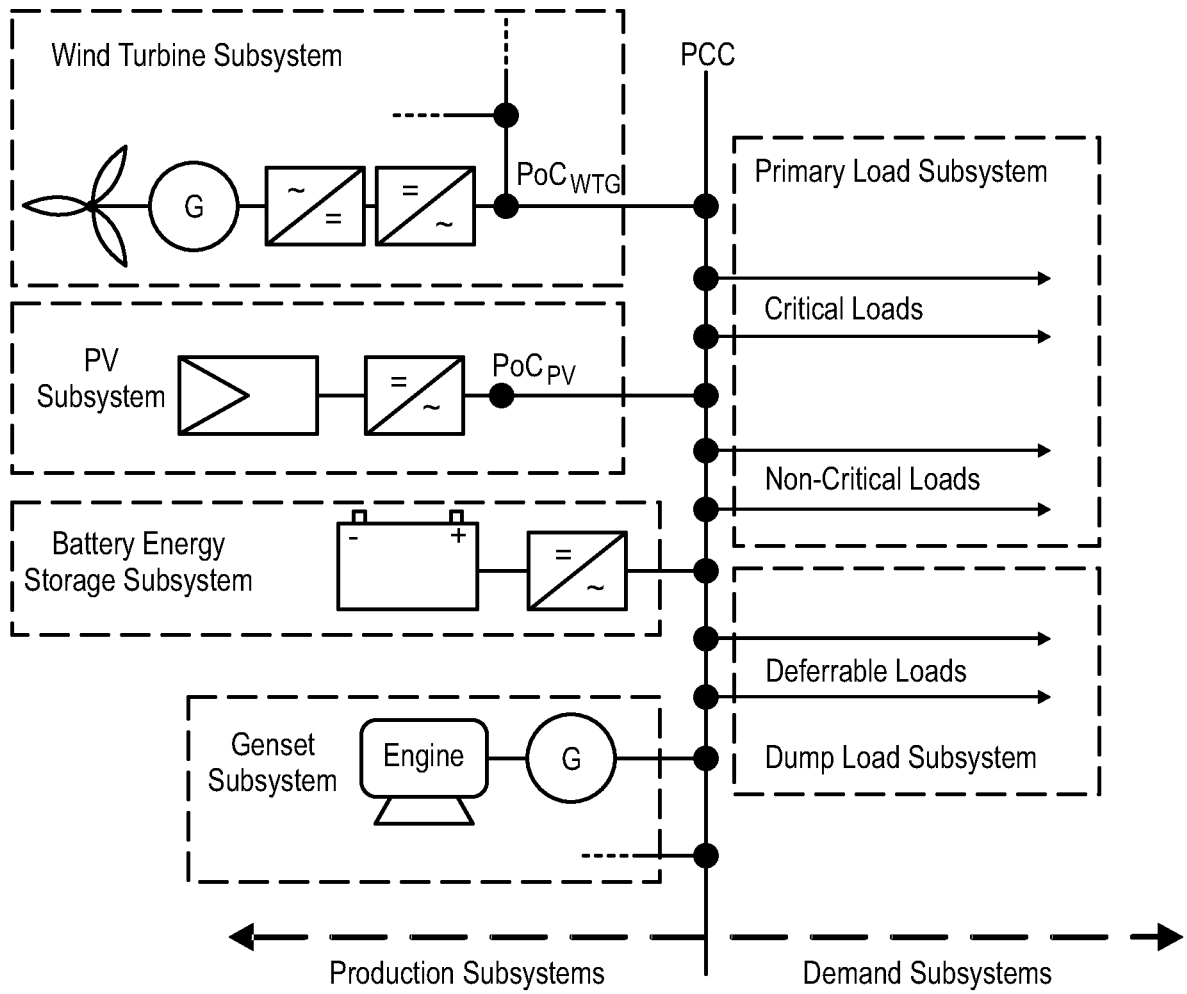
FIG. 1 shows a generic single line diagram of a hybrid power plant topology, entirely based on LV infrastructure.

While the invention is susceptible to various modifications and alternative forms specific embodiments have been shown by way of examples in the drawings and will be described in details herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE INVENTION

In a general aspect the present invention relates to a methodology with focus on off-grid HPPs comprising WTGs, PVs, BESSs and gensets. The size category of the HPPs relates to the most common user applications, i.e. residential and communities containing a mix of residential, commercial and small industrial consumers. In this context, the anticipated installed capacity of off-grid HPP, where production and consumption is in near proximity, is below 1 MW. However, another demanding user application for on-site off-grid HPPs is found in energy-intensive industry (e.g. pulp mill, cement kiln) or military bases. Here the typical size of the required generation capacity is 5-100 MW, potentially up to 400 MW. The aspect of further upscaling to multi-MW level will also be addressed.

The off-grid HPPs of the present invention have modular and scalable system topologies, and an optimal sizing method is developed in order to determine the installed capacities of WTGs, PVs, battery energy storage systems and gensets. The optimal sizing method relies on a robust sizing method with respect to the required resolution of resource data in order to account for intra-hour power variations. Moreover, the involvement of the electrical infrastructure enables a precise estimation of power losses within the HPP as well as the consideration of both active and reactive power load demand for optimally sizing the plant components. The main outcome is a methodology to determine feasible system configurations of modular and scalable wind integrated HPP solutions for off-grid applications.

A. Demand Subsystems

The main objective is the connection of end-customers to the supply connection point, i.e. the point of common coupling (PCC). The demand subsystems are indicated by numerous radial LV-feeders. Their characteristics are dependent on the actual community layout, the occurrence of feeder branching, the present consumers and electric parameters of cables and overhead lines. Critical (emergency) and non-critical (possibly sheddable) loads belong to the primary load subsystem as the aggregated electrical load that the system shall meet in order to avoid power shortage. Deferrable loads are assigned to the dump load subsystem, characterized by the excess electricity produced by the DERs in order to be used for deferrable consumption.

B. Production Subsystems

The connection of all DERs on the AC side provides the advantage that HPPs can be designed and expanded with standardized components on a flexible and modular basis. Additionally, such HPP will be compliant with available regulatories for safety and protection. In FIG. 1 the BESS and genset subsystem are directly interfaced with the PCC. The WTG and PV subsystem exhibit a separate point of connection (PoC), respectively. In most cases they need to be located further away from the community due to spacious constraints and natural resource requirements, i.e. wind conditions and exposure to solar irradiation. The interconnection with the PCC can be realized via overhead lines or cables (e.g. a few hundred meters up to several km). WTGs, PV arrays and batteries are grid interfaced via converters, such having the capability of delivering reactive power if required by the load. The prime movers of fuel based systems convert their energy usually via synchronous generators, which provide reactive power capability according to their power factor rating.

Figure 2:
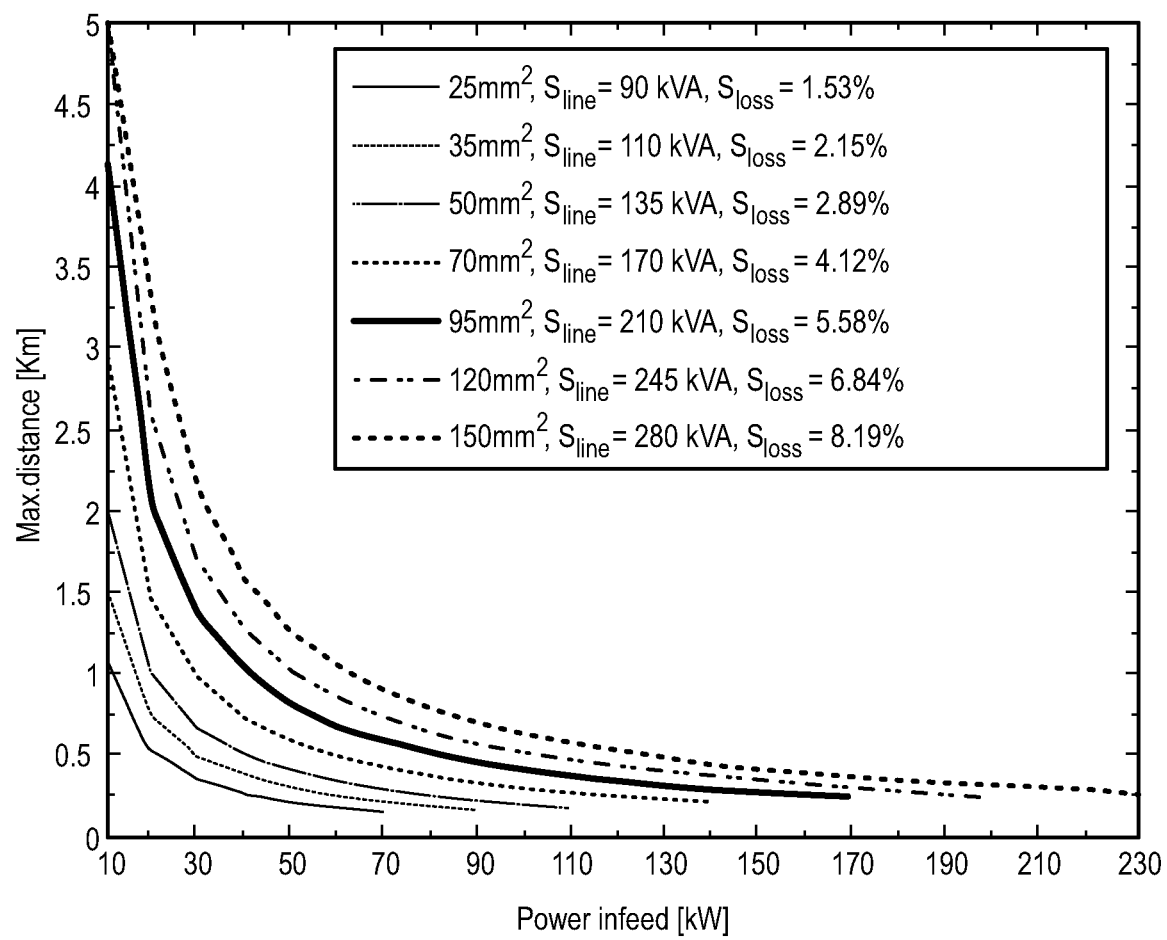
FIG. 2 shows maximum distance between RES and PCC according to various power infeeds and for different line diameters, accounting for a maximum voltage drop of $\Delta V=6\%$.

The system topology shown in FIG. 1 operates on one common voltage level. Thus the balance of plant has low CAPEX, as transformers can be avoided. However, due to the highly resistive characteristics of LV lines high OPEX is expected due to power losses. Moreover, the maximum distance between the PCC and the renewable energy sources (RES) is limited due to voltage drops across the lines. FIG. 2 illustrates this phenomenon, taking to account that the voltage drops should not exceed $\Delta V=6\%$. As the characteristics depend highly on the selected line diameter (the higher the diameter, the smaller the resistance), the maximum distance depending on the actual power infeed from RES is shown for various commercially available line types. It can be remarked that larger line diameters enable more distant RES, however with the drawback of higher power losses (OPEX) and cable costs (CAPEX). If the WTG or PV subsystem's rated capacity was 70 kW, the maximum distance would be less than 250 meters with power losses of $S_{loss}=1.53\%$, using a 25 mm²-line. The distance can be increased towards 900 meters by choosing a 150 mm²-line, however the corresponding line losses amount to $S_{loss}=8.19\%$ which is unacceptable. The aim of the present invention is to determine a HPP architecture that allows configuration of discrete DER modules and a certain degree of scalability of the HPP by taking into account the expected demand growth over years.

Figure 3:
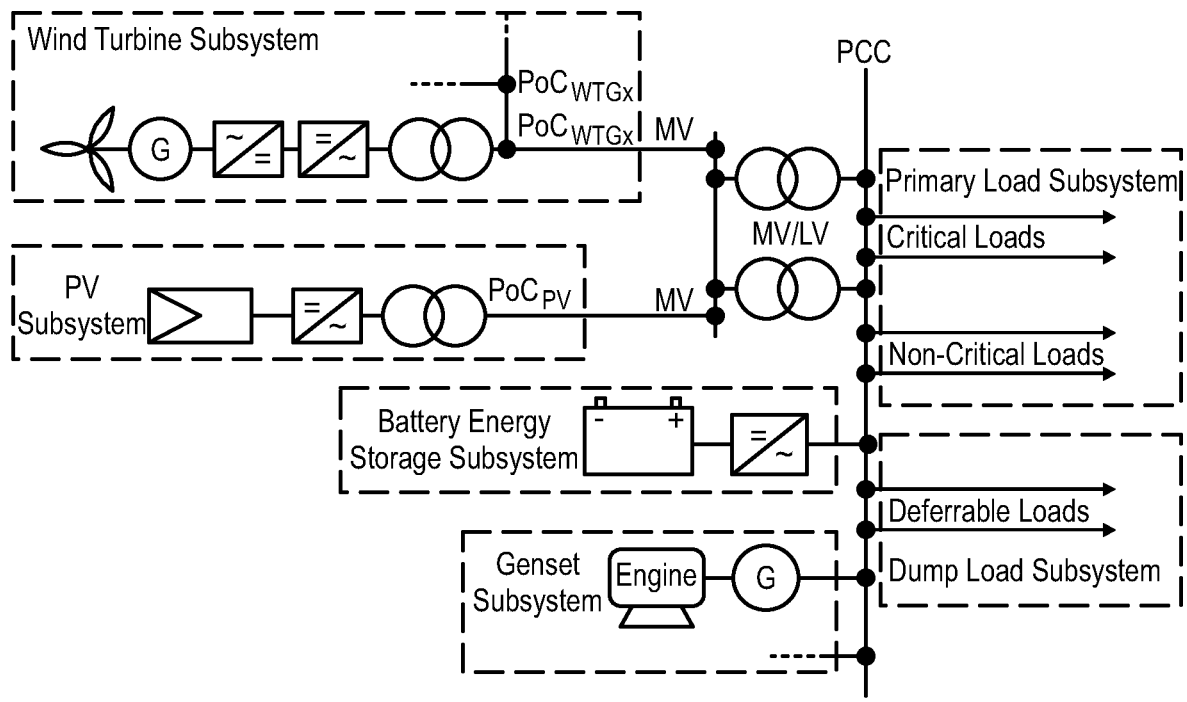
FIG. 3 shows a generic single line diagram of the proposed hybrid power plant topology.
Figure 4:
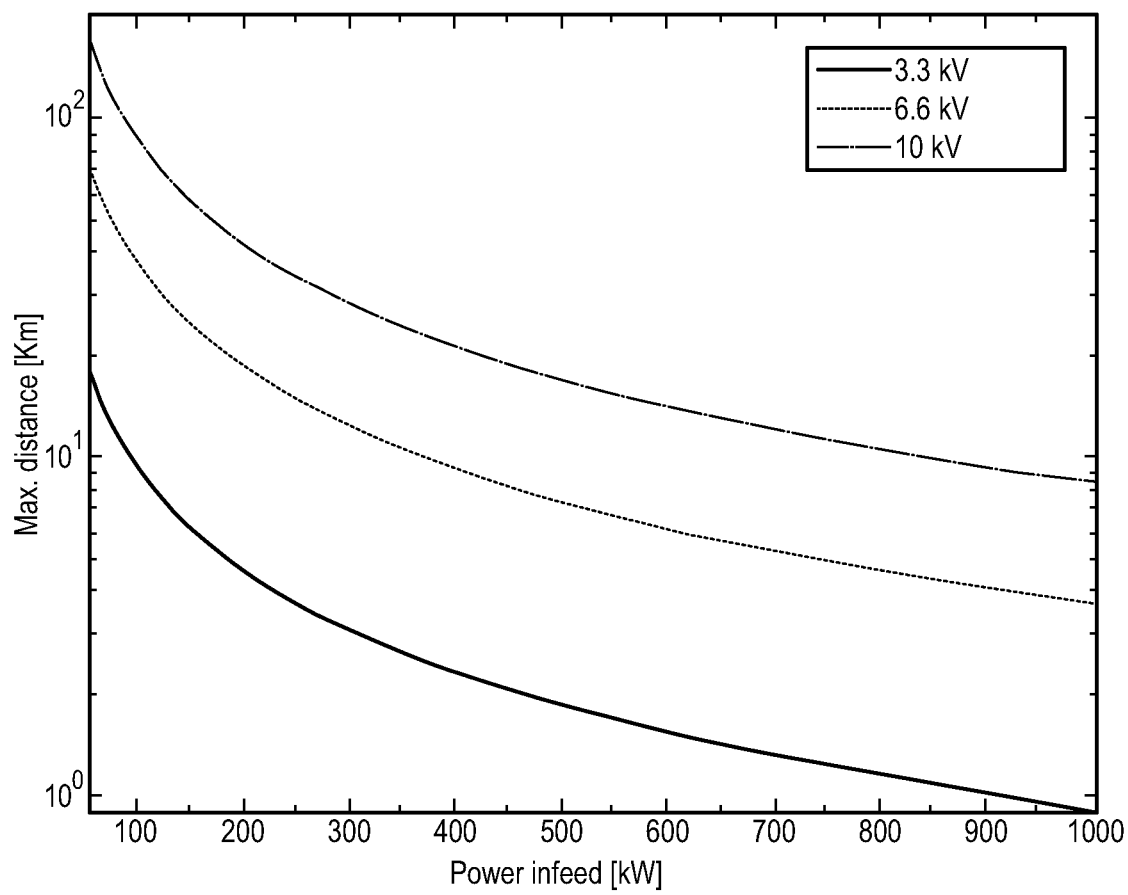
FIG. 4 shows maximum distance between RES and PCC according to various power infeeds for MV levels, accounting for a maximum voltage drop of $\Delta V=6\%$.

Hence, the most suitable system topology is presented in FIG. 3. A MV/LV substation transformer at the PCC acts as the grid connection interface of WTG and PV subsystem. The use of MV lines reduces the power losses and corresponding voltage drops. Moreover, a modular and redundant approach is realized by integrating step up transformers on DER level. The choice of the MV level depends on the desired scalability of the HPP with regards to the installed RES capacity. Lower MV levels are preferred due to the involved cost of substation equipment (switchgear, transformers etc.). FIG. 4 shows the maximum possible distance (logarithmic scale) depending on the actual power infeed of the RES, for different common voltage levels.

A maximum power infeed of 1000 kW is considered and takes into account that the double RES capacity may be required to supply the consumers of a rural community, where a peak power demand of more than 500 kW is not expected. The optimal voltage level depends on the expected RES power capacity and siting of WTG and PV subsystems. A 6.6 kV level will enable distances up to 4 km, even for high power infeed levels (900 kW). Additionally, it offers a flexible setup for the connection of gensets, as 6.6 kV is a common voltage level for diesel gensets rated above 800 kW.

Figure 5:
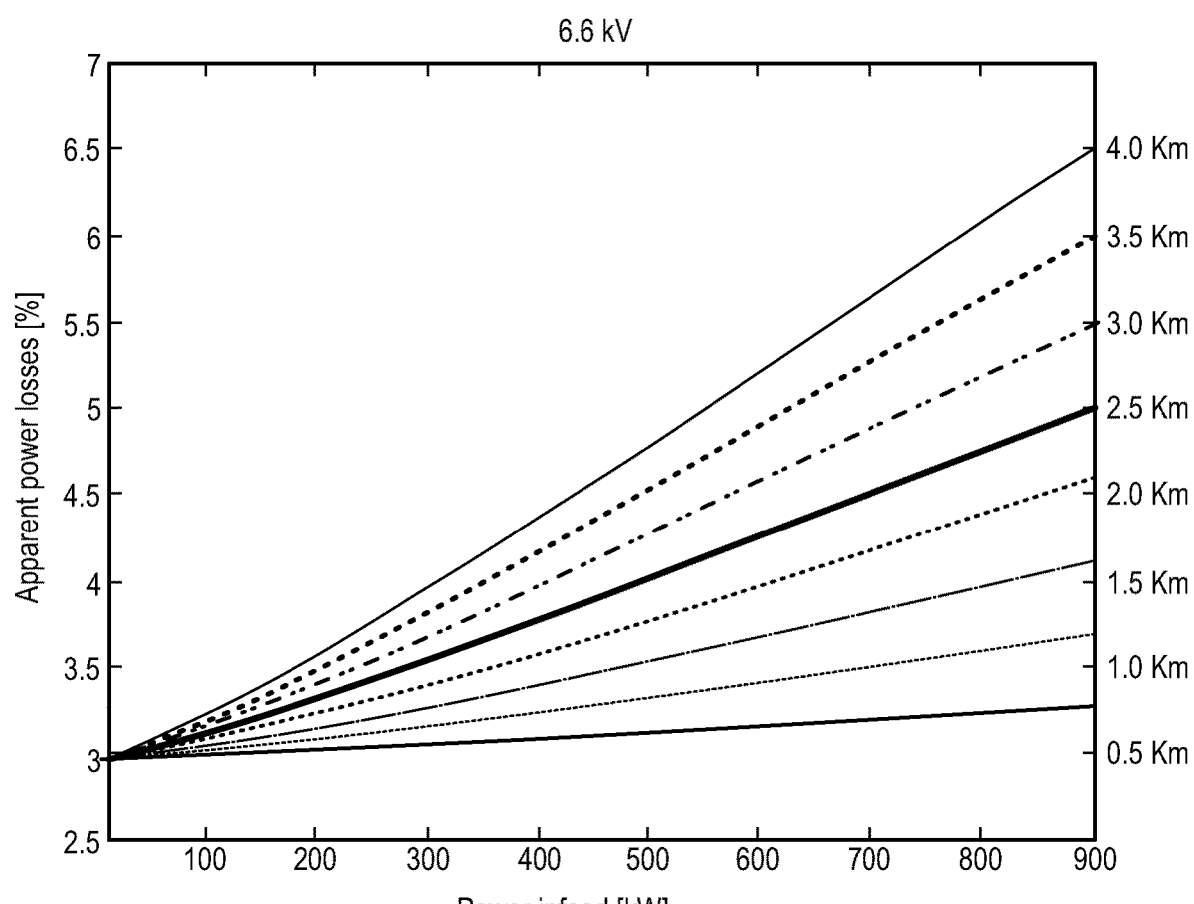
FIG. 5 shows apparent power losses according to various power infeeds and for different distances between RES and PCC.

FIG. 5 shows the expected power losses for such system topology. Depending on the power infeed from RES and the distance between RES and PCC, the power loss has a significant share of between 3% and 6.5%. Hence, it is to be expected that the power losses affect the energy analysis and need to be taken into account for the sizing method to be developed.

III. Subsystem Models

This section describes the approach for modeling the individual system components. The focus is to capture the system dynamics which are relevant with respect to the operational scheduling with a maximum time resolution of 1 minute. First, the physical characteristics of the subsystems are described, whereupon the respective economic models are shortly summarized.

A. Physical Models

Figure 6:
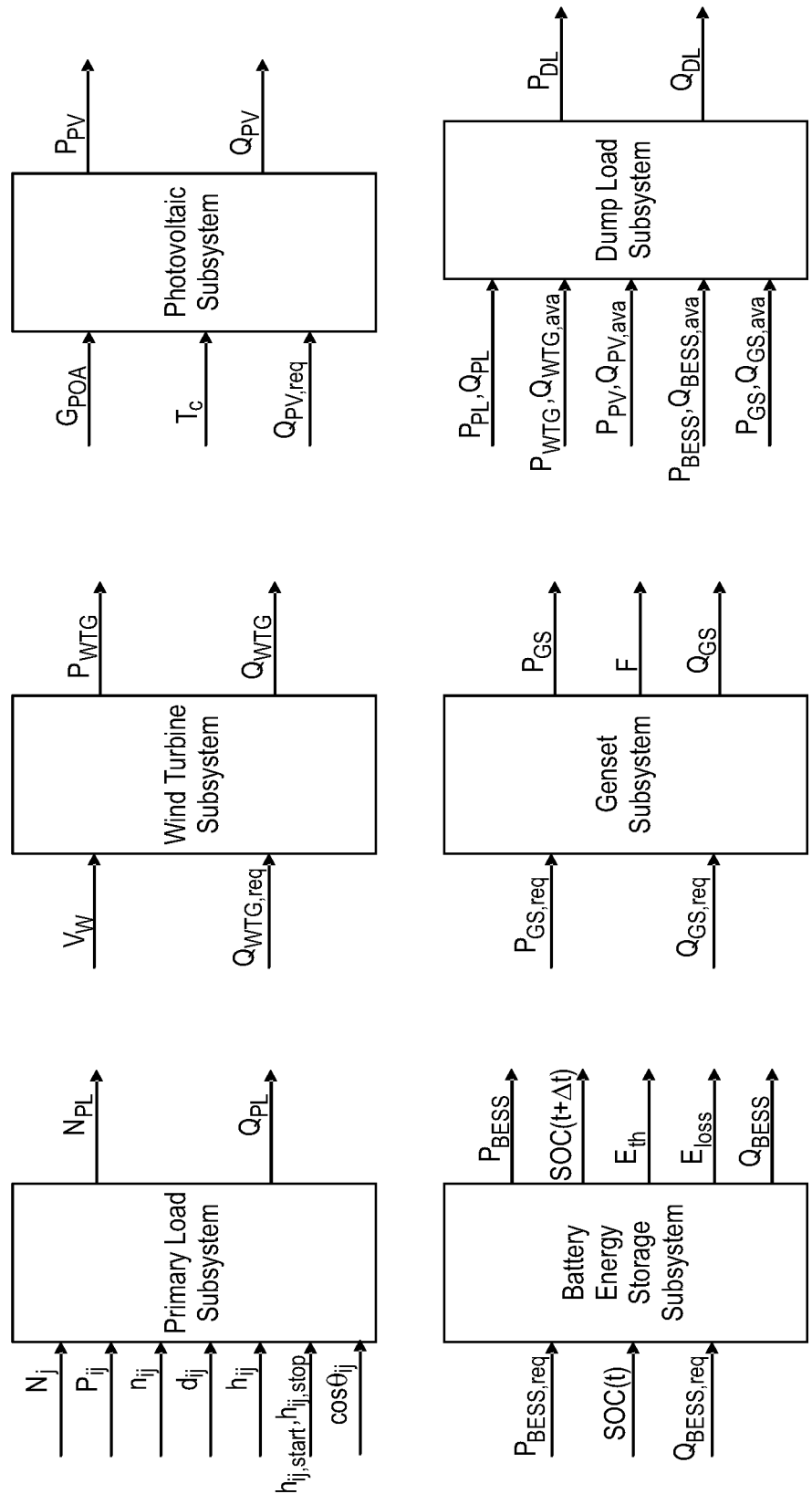
FIG. 6 shows a bock diagram of subsystem models.

FIG. 6 presents a block diagram with the corresponding in- and outputs of all subsystem models.

In many areas, particularly in developing countries, very few information is available regarding the load demand of present electricity consumers. Hence, it is necessary to model the end user's electric need in order to compute load demand profiles of the primary load subsystem. One method is proposed in, where end-consumers are grouped into different classes, which are defined by considering that consumers within the class show a similar demand behavior. Then, the present number $n_{ij}$ of electrical appliances i within each user class j are described by means of power consumption $P_{ij}$, continuous functioning cycle $d_{ij}$, total functioning time hu and functioning windows ($h_{ij,start}$, $h_{ij,stop}$) during the day. In this way, the total required daily energy demand of each user class with specific number of users $N_j$ and thereby the corresponding load profile for active power $P_{PL}$ and reactive power $Q_{PL}$ can be determined, taking into account the rated power factor $\cos\theta_{ij}$ of each electrical appliance.

The WTG's active power output PWTG at its PoC is a function of wind speed $v_w$ and is generally given by the turbine power curve. The PV's active power output $P_{PV}$ at its PoC is mainly a function of the plane-of-array irradiance $G_{POA}$ and the solar cell temperature $T_c$ at the intended site. The power temperature coefficient model provides a comprehensive description of the characteristics and is given by Eq. 1

$$P_{PV} = \eta_{PV} \cdot \frac{G_{POA}}{G_{STC}} P_{PV,rat}[1 + \gamma \cdot (T_C - T_{STC})] \quad (1)$$

where $\eta_{PV}$ is the power conversion efficiency, $T_c$ the solar cell temperature, $\gamma$ the temperature coefficient and $G_{STC}$, $T_{STC}$, $P_{PV,rat}$ the solar irradiance, the temperature and the rated peak power of the PV array under standard test conditions (1000 W/m², 25 C).

The active power $P_{BESS}$ of the BESS at its PoC depends mainly on the power request signal $P_{BESS,req}$, the BESS characteristics and the actual battery state SOC(t). The characteristics of the BESS refer to the total storage capacity, the roundtrip efficiency of the battery, the max. charging/discharging current of the battery as well as the total power rating and power losses of the converter system. Here the maximum state-of-charge limit is assumed to be $SOC_{max}$=0.8 pu, considering that the battery capacity degrades during the lifespan. The end-of-life criterion is commonly defined as, when the energy capacity has decreased by 20%. The model output reveals the updated SOC at time t+$\Delta$t, the energy throughput $E_{th}$ and the energy Eloss lost in the battery during the time period $\Delta$t. The reactive power output of WTG ($Q_{WTG}$), PV ($Q_{PV}$) or BESS subsystem ($Q_{BESS}$) depends on the requested signal ($Q_{WTG,req}$, $Q_{PV,req}$, $Q_{BESS,rq}$) and the reactive power capability of the converter system. It is assumed that the system design of each converter interfaced DER (WTG, PV or BESS) shall account for minimum costs, i.e. overrating of components shall be avoided. In this way, the rated apparent power $S_{DER,rat}$ shall be equal to the rated power value of the DER, i.e. $P_{DER,rat}$. Then, the available reactive power of the DER $Q_{DER,ava}$ is depending on the actual power production as per Eq. 2.

$$Q_{DER,ava} = \sqrt{S_{DER,rat}^2 - P_{DER}^2} \quad (2)$$

This assumption may apply for kW-scale DERs. MW-scale DERs are generally designed to meet demanding grid code requirements and thereby have available increased converter ratings.

The genset active power output PGS at its PoC is a function of the power request $P_{GS,req}$ subject to the minimum load ratio $f_{GS,min}$, which is the minimum allowable load on the generator during operation, expressed in per unit of its rated capacity $P_{GS,rat}$ (see Eq. 3). This constraint exists, since manufacturers recommend that their generators shall not run below certain load to avoid mechanical failures. A typical value is $f_{GS,min}$=0.3.

$$P_{GS,min} = f_{GS,min} \cdot P_{GS,rat} \quad (3)$$

The fuel consumption F of the genset can be described by the linear fuel curve as per Eq. 4

$$F = F_0 \cdot P_{GS,rat} + F_1 \cdot P_{GS} \quad (4)$$

where $F_0$ is the generator fuel curve intercept coefficient in [L/h*kW$_{rated}$] and $F_1$ the generator fuel curve slope coefficient in [L/h*kW$_{output}$]. Linear fuel curves are provided for many commercially available gensets. However, in order to improve the accuracy of the genset fuel consumption, non-linear fuel curves are to be obtained. The reactive power output $Q_G$s of the genset is determined by the request signal $Q_{GS,req}$ and the generator capability curve. The reactive power capability is defined by the armature current limit, field current limit and end region heating limit of the generator.

The dump load is an equivalent of the excess power, when the generated power cannot be fully consumed by the primary load or stored in the BESS. One way is to curtail the RES during excess energy production, which requires from the WTGs and PV to be capable of regulating the power output (by blade pitching in case of WTGs). Another way is to use the energy to supply a deferrable load. The dump load active power profile $P_{DL}$ and the remaining available reactive power $Q_{DL}$ by all DERs is a result of the optimization method described in the following section.

B. Economic Model

The economic model considers the capital, replacement, fuel, operation and maintenance costs as well as the salvage value of the subsystems. It requires knowledge about component costs and lifetimes as well as operational parameters (e.g. BESS energy throughput, genset fuel consumption). In this analysis, the discount factor is applied to calculate the present value of a cash flow that occurs in any year N of the project lifetime $N_p$. The discount factor $f_d$ is calculated as per Eq. 5 and 6

$$f_d(N) = \frac{1}{(1 + r_1)^N} \quad (5)$$

$$r_1 = \frac{1 + r_2}{1 + r_3} - 1 \quad (6)$$

where N is the number of years and $r_1$, $r_2$ $r_3$ are the discount rate, interest rate and inflation rate, respectively. The total net present cost (NPC) of the HPP is determined by Eq. 7 as the total of all subsystem costs, i.e. WTG, PV, BESS, genset as well as the substation and distribution lines.

$$C_{NPC,HPP} = C_{WTG} + C_{PV} + C_{BESS} + C_{BESS,con} + C_{GS} + C_{SS} + C_{LN} \quad (7)$$

The annualized cost $C_{ann,HPP}$ takes into account the capital recovery factor CRF, which is a ratio used to calculate the present value of an annuity (Eq. 8 and 9).

$$C_{ann,HPP} = CRF \cdot C_{NPC,HPP} \quad (8)$$

$$CRF = \frac{r_1 \cdot (1 + r_1)^{N_p}}{(1 + r_1)^{N_p} - 1} \quad (9)$$

The levelized cost of energy (LCOE) is calculated as the average cost per kWh of useful electrical energy produced by the system (Eq. 10)

$$LCOE = \frac{C_{ann,HPP}}{E_{PL,served}} = \frac{C_{ann,HPP}}{E_{PL} - E_{short}}. \quad (10)$$

where $E_{PL}$ and $E_{short}$ are the total energy of primary load subsystem and the total energy shortage for one year, respectively.

IV. Optimal Sizing Method

The developed optimization method for sizing off-grid HPPs applies the subsystem and economic models described in previous sections. First, the optimization problem is formulated including decision variable, objective function and constraints. Subsequently, the individual simulation steps are explained.

A. Problem Formulation

The decision variables of the optimization method refer to the ratings of the individual components, i.e. rated power $P_{WTG,rat}$ of the WTG subsystem, rated power $P_{PV,rat}$ of the PV subsystem, rated energy capacity $E_{BESS,rat}$ of the BESS subsystem, rated power $P_{BESScon,rat}$ of the BESS converter, number of gensets $n_{GS}$, rated power $P_{GSx,rat}$ of the n-th genset and the substation transformer rating $S_{TR,rat}$. The decision variable vector is presented in Eq. 11.

$$X = \begin{bmatrix} P_{WTG,rat} & P_{PV,rat} & E_{BESS,rat} & S_{TR,rat} \\ P_{BESS-con,rat} & n_{GS} & P_{GSx,rat} & \end{bmatrix} \quad (11)$$

The optimization problem is formulated such as to minimize LCOE, subject to the constraints of Eq. 12-13.

$$LPSP \leq LPSP_{max} \quad (12)$$

$$X \in \chi \quad (13)$$

where $\chi$ is the feasibility region of the decision variables and the LPSP is the probability of insufficient power supply for the present load demand and is expressed by the sum of time when the HPP is not able to supply the load demand vs. the total observed time (e.g one year) as per Eq. 14

$$LPSP = \frac{\sum_{t=1}^{T} \{\Delta t_f \text{ for } (P_S(t) < P_{PL}(t)) \text{ or } (Q_S(t) < Q_{PL}(t))\}}{T} \quad (14)$$

where T, $\Delta t_f$, $P_S(t)$, $Q_S(t)$, $P_{PL}(t)$ and $Q_{PL}(t)$ are the total observed time period (one year), the time period of power failure, the supplied active and reactive power as well as the active and reactive power demand of the primary load subsystem, respectively.

B. Simulation Steps

Figure 7:
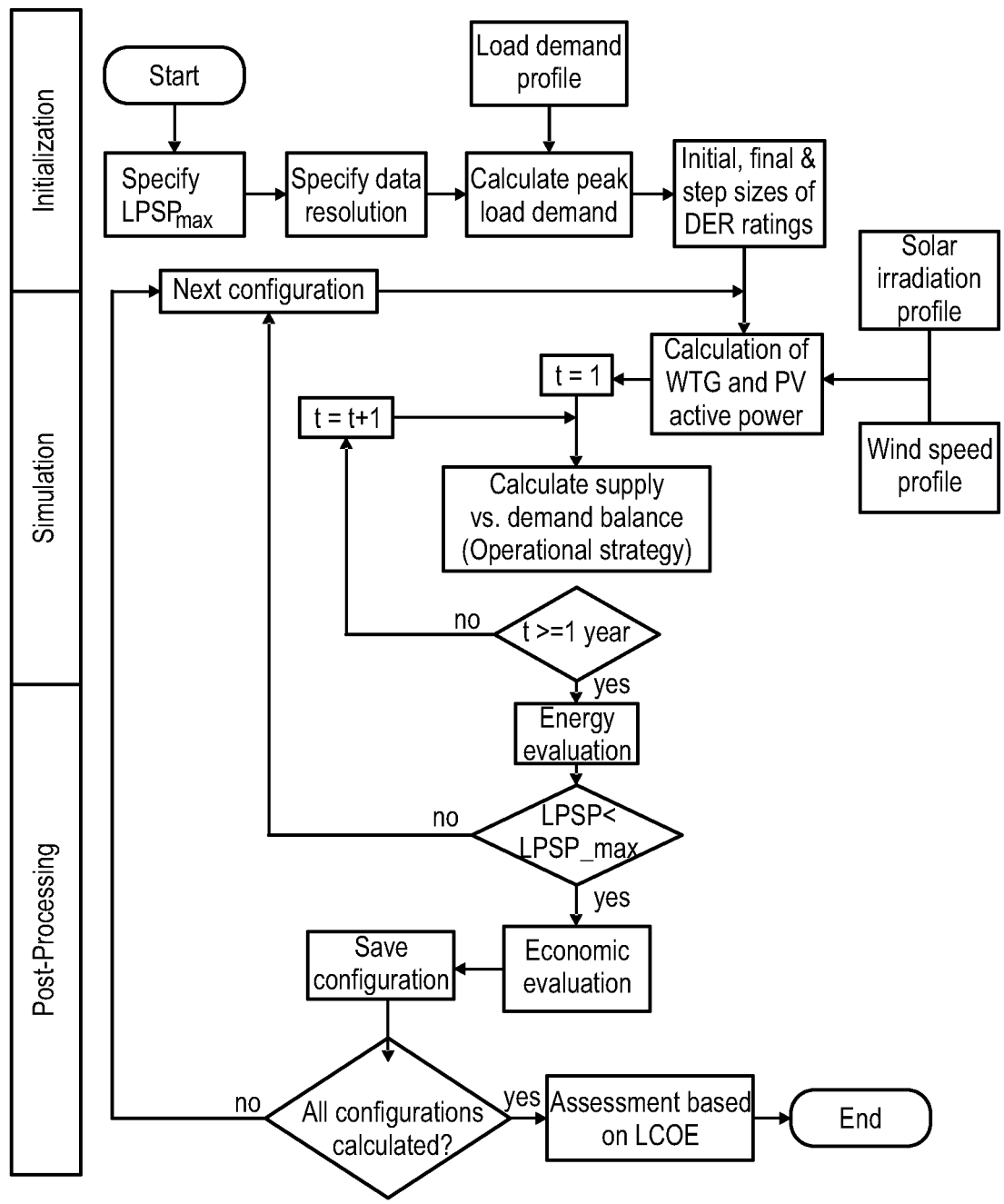
FIG. 7 shows a flowchart of optimization method the system configuration.

The method for determining the optimal sizes of the DERs within the HPP follows an enumeration-based single-objective optimization approach. The corresponding flowchart is shown in FIG. 7 and comprises three major stages, i.e. initialization, simulation and post-processing. The general sequence for the simulation and post-processing stage is based on the work in. However, in the present invention an additional focus is laid on the initialization stage to limit the search space for accelerated computational performance. Moreover, the detailed methods for two operational strategies are developed and applicable for the wind integrated HPP being in scope of the present invention.

B.1 System Initialization

The objective of the system initialization process is to define the search space of the decision variables. Here, the aim is to limit the search space to the minimum required in order to reduce the computational time of the method. In this way, the following steps impose additional constraints to the optimization problem. The system initialization begins with specifying the permitted loss of power supply probability $LPSP_{max}$ as well as the data resolution of the simulation. The state-of-the-art approach is to use hourly mean values. However, if more granular data of the wind and solar resource as well as the load demand are available, the time intervals can be reduced down to 1 minute. In the next step, the initial value, final value and step sizes of the decision variables are specified. The maximum size of WTG subsystem $P_{WTGs,rat,max}$ and PV subsystem $P_{PV,rat,max}$ are determined according to the required annual energy consumption. It is expected that the total required energy produced by WTG or PV subsystem, respectively, will not exceed the total energy consumption, so that Eq. 15 and 16 are applied $$P_{WTGs,rat,max} = \left\lceil \frac{E_{PL}}{E_{WTG,1kW} \cdot P_{WTG,rat}} \right\rceil \cdot P_{WTG,rat} \quad (15)$$

$$P_{PV,rat,max} = \left\lceil \frac{E_{PL}}{E_{PV,1kW}} \right\rceil \quad (16)$$

where $E_{WTG,1kW}$ and $E_{PV,1kW}$ is the total energy produced by 1 kW WTG and PV subsystem, respectively, measured in kWh/kW. The final numbers are rounded up towards integer numbers of feasible ratings. Then, the number x of discrete variables within the search space $$\left( \left[ 0 : \frac{P_{WTGs,rat,max}}{x-1} : P_{WTGs,rat,max} \right] \text{ and } \left[ 0 : \frac{P_{PV,rat,max}}{x-1} : P_{PV,rat,max} \right] \right)$$

is selected according the desired granularity. Note, that there is a trade-off between accuracy and computational time. The rating of each of the two substation transformers is selected according the installed RES capacity as per Eq. 17.

$$S_{TR,rat} = P_{WTG,rat} + P_{PV,rat} \quad (17)$$

The step size $E_{BESS,rat,step}$ of the BESS capacity rating is selected in order to supply the average load consumption for 1 hour, as per Eq. 18.

$$E_{BESS,rat,step} = \left\lceil \frac{E_{PL}}{8760} \right\rceil \quad (18)$$

The search interval with number x of discrete variables within the search space is determined as [0: $E_{BESS,rat,step}$: $(x-1) \cdot E_{BESS,rat,step}$]. During the assessment studies it is observed that the maximum required BESS capacity does not exceed 8 hours of the average load consumption (x=9).

As the cost of power electronics has become relatively low, the BESS converter rating is selected to supply the peak load demand in time periods with low wind speed and solar irradiation and to avoid the start-up of genset units (see Eq. 19).

$$P_{BESS-con,rat} = \lceil P_{PL,peak} \rceil \quad (19)$$

With regard to sizing the genset subsystem, it is anticipated that various feasible setups need to be investigated, as there is a trade-off between OPEX, redundancy and fuel costs depending on number of gensets in the HPP. Concerning the level of required maintenance, one genset is favorable compared to numerous gensets. However, the redundancy increases with the number of available gensets. The fuel expenses depend on the minimum load ratio and the fuel efficiency curve of the respective genset. One important advantage of having numerous gensets running in parallel is expandability on a modular basis in case of load demand growth during the project lifetime. The individual ratings of the gensets respect the commercially available products. In the range between 10-100 kW products are available with an interval size of 10 kW, while for systems larger than 100 kW the possible increment is 50 kW. Following scenarios are considered to ensure 100% power supply availability for time periods with very low renewable generation and low SOC of the BESS:

One genset to cover the peak load demand.
Two gensets with equal ratings to cover the peak load demand.
Three gensets with equal ratings to cover the peak load demand

B.2 System Simulation and Post-Processing

The simulation begins by obtaining the annual active power profiles of WTG and PV subsystem respectively by using the models described in section III. Subsequently, the balance of demand vs. supply is calculated during each time step of a whole year by using one of the operational strategies described in the following subsection. The post-processing of a certain system configuration contains the calculation of the key parameters such as LPSP. If the permitted value for $LPSP_{max}$ is violated, the corresponding system configuration is discarded and the simulation is repeated with updated decision variables of the DERs. The economic evaluation is accomplished by using the economic models described in previous section. Finally, the decision variables of all system configurations are assessed based on the resulting LCOE of the HPP.

B.3 Operational Strategy—Load Following

The operational strategy is a set of rules used to schedule the operation of the BESS and, if present, gensets whenever there is insufficient power from RES to supply the primary load demand. The most common operational strategies are the Load Following (LF) strategy and the Cycle Charging (CC) strategy. By applying the LF strategy, whenever a genset operates, it produces only sufficient power to meet the primary load demand. Under the CC strategy, whenever a genset is required to operate to supply the primary load, it operates at rated output power. The LF strategy tends to be optimal in systems with a lot of renewable power, when the renewable power output sometimes exceeds the load. In contrast, the CC strategy tends to be optimal in systems with little or no renewable power, which does not apply for the HPPs investigated here. The aim of the present invention is to extend the state-of-the-art strategies in order to represent both active and reactive power flow within the HPP. Hence, the models of the operational strategies are formulated with the aim of maintaining for each time step the balance of active and reactive power. Whenever these equations cannot be solved due to insufficient active or reactive power by the DERs, an event of power shortage occurs. The DERs are utilized to meet the primary load demand in the following sequence of priority: 1. PV and WTG subsystem, 2. BESS subsystem, 3. Genset subsystem (if present). It is chosen to prioritize the RES subsystems for supplying the reactive power demand, since the BESS and genset subsystem shall have enough Q availability to compensate the short-term power fluctuations.

Figure 8:
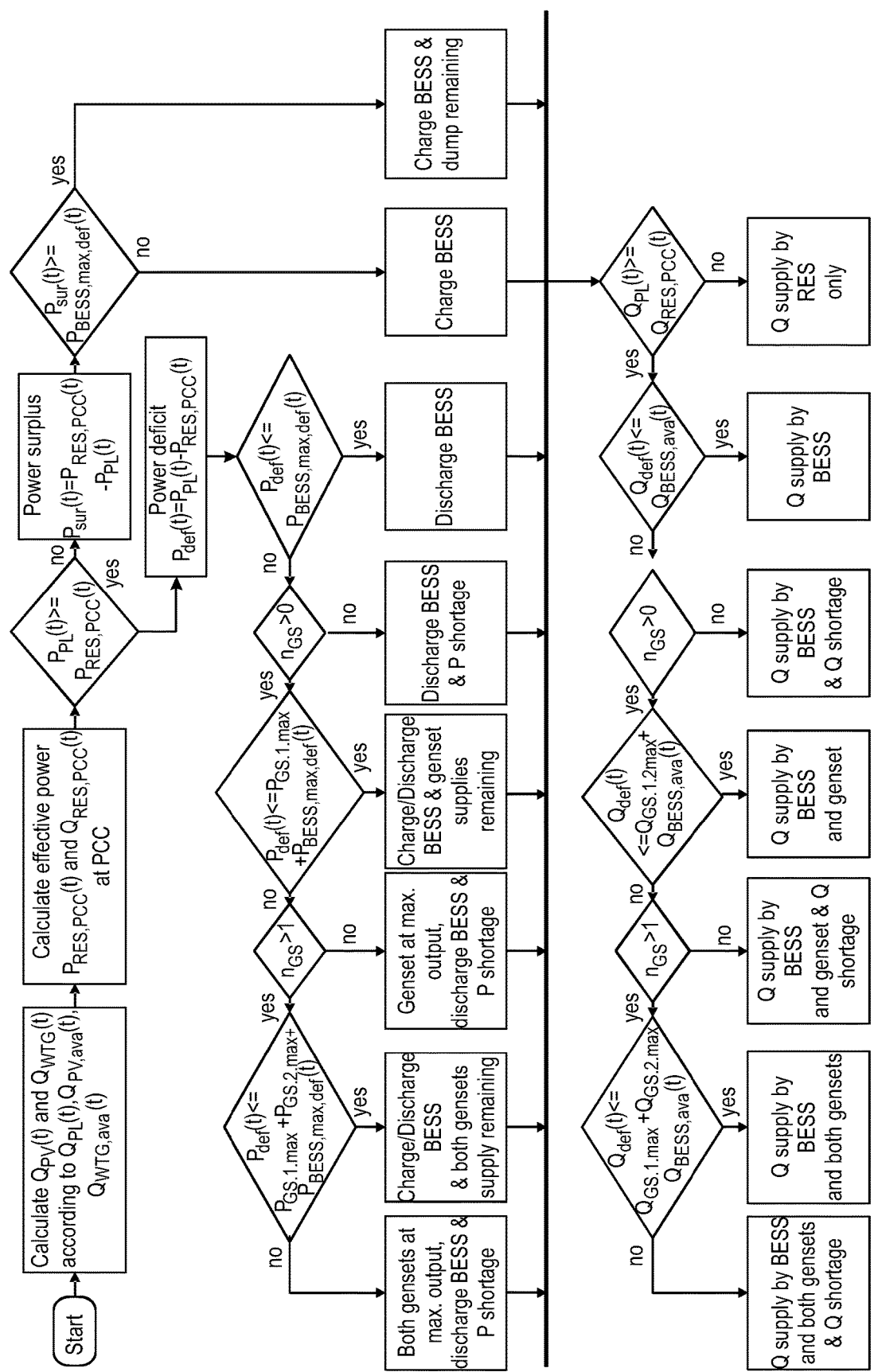
FIG. 8 shows a flowchart of Load Following strategy.

FIG. 8 shows the flowchart of the LF strategy. First, the reactive power outputs of WTG and PV subsystem are determined. $Q_{PV}(t)$ and $Q_{WTG}(t)$ are calculated according to the required load demand $Q_{PL}(t)$ and the available reactive power $Q_{PV,ava}(t)$ and $Q_{WTG,ava}(t)$. Then the effective active power $P_{RES,PCC}(t)$ and reactive power $Q_{RES,PCC}(t)$ at the LV side of the substation (the PCC) are obtained according to Eq. 20-24. The total power generation $S_{RES}(t)$ at the sending end of the MV line amounts to:

$$S_{RES}(t)=P_{RES}(t)+jQ_{RES}(t)=P_{WTG}(t)+P_{PV}(t)+ j(Q_{WTG}(t)+Q_{PV}(t)) \quad (19)$$

Then the voltage $V_{RES}(t)$ at the sending end is calculated as per Eq. 21.

$$V_{RES}(t) = V_{PCC} + \frac{R_{LN}P_{RES}(t)+X_{LN}Q_{RES}(t)}{V_{RES}(t)} + j\frac{X_{LN}P_{RES}(t)-R_{LN}Q_{RES}(t)}{V_{RES}(t)} \quad (21)$$

The current flowing through the line amounts to:

$$I_{LN} = \frac{S^*_{RES}(t)}{V^*_{RES}(t)} \quad (23)$$

Finally, the effective power at PCC is obtained by Eq. 24.

$$S_{RES,PCC}(t)=P_{RES,PCC}(t)+jQ_{RES,PCC}(t)=V_{PCC} \cdot I_{LN^*} \quad (24)$$

When there is a surplus of power generation from RES ($P_{PL}(t)<P_{RES,PCC}(t)$), it is used to charge the BESS. The charging capability of the BESS depends on its SOC, charging rate and converter rating, resulting into a maximum charging power $P_{BESS,max,ch}$. When surplus power cannot be fully stored, then the remaining power is supplied to the dump load.

When there is a power deficit ($P_{PL}(t)>P_{RES,PCC}(t)$), the BESS is discharged up to its maximum discharging power $P_{BESS,max,dch}$. If the BESS cannot deliver sufficient power, an event of power shortage occurs, unless gensets are present in the HPP. In this case ($n_{GS}>0$), the genset goes into operation and supplies the remaining primary load demand. Due to the load ratio constraint of an operating genset, the delivered power may exceed the deficit power $P_{def}(t)$. Thus, the remaining power by the genset is used to charge the BESS.

If the power of BESS and primary genset are not sufficient to meet the load demand, an event of power shortage occurs, unless several gensets is available ($n_{GS}>1$). Any further genset follows the same logic as the primary genset, i.e. its operational state is determined in order to follow the primary load demand.

When the reactive power demand cannot be fulfilled by RES, the BESS available reactive power is utilized to supply the deficit $Q_{def}(t)$. An event of reactive power shortage occurs, if the BESS rating is reached, unless gensets are present in the HPP. In this case, the reactive power capability of the genset is utilized. Only, if the reactive power deficit cannot be compensated, an event of reactive power shortage occurs, unless a further genset is available to contribute with additional reactive power.

C. Method Validation

The purpose of this section is to present representative simulation results in order to validate the performance of the sizing method. The proposed method of the present invention is validated against the simulation platform HOMER Pro®. An exemplary load demand profile including residential, commercial and small industrial consumers is applied and renewable resource data from a site with high wind conditions are used here. Some assumptions are made due to the design limitations in HOMER Pro®. E.g. it is not possible to include the electrical infrastructure of the HPP (i.e. substation transformers and distribution lines), as the design specification is limited to the DER components.

Hence, the distance between RES subsystems and PCC is neglected during the simulations and the costs of any substation and lines are not taken into consideration. Moreover, it is not possible to account for reactive power load demand. Hence, the simulations are limited to an energy analysis based on the balance of active power supply and demand.

Figure 9:
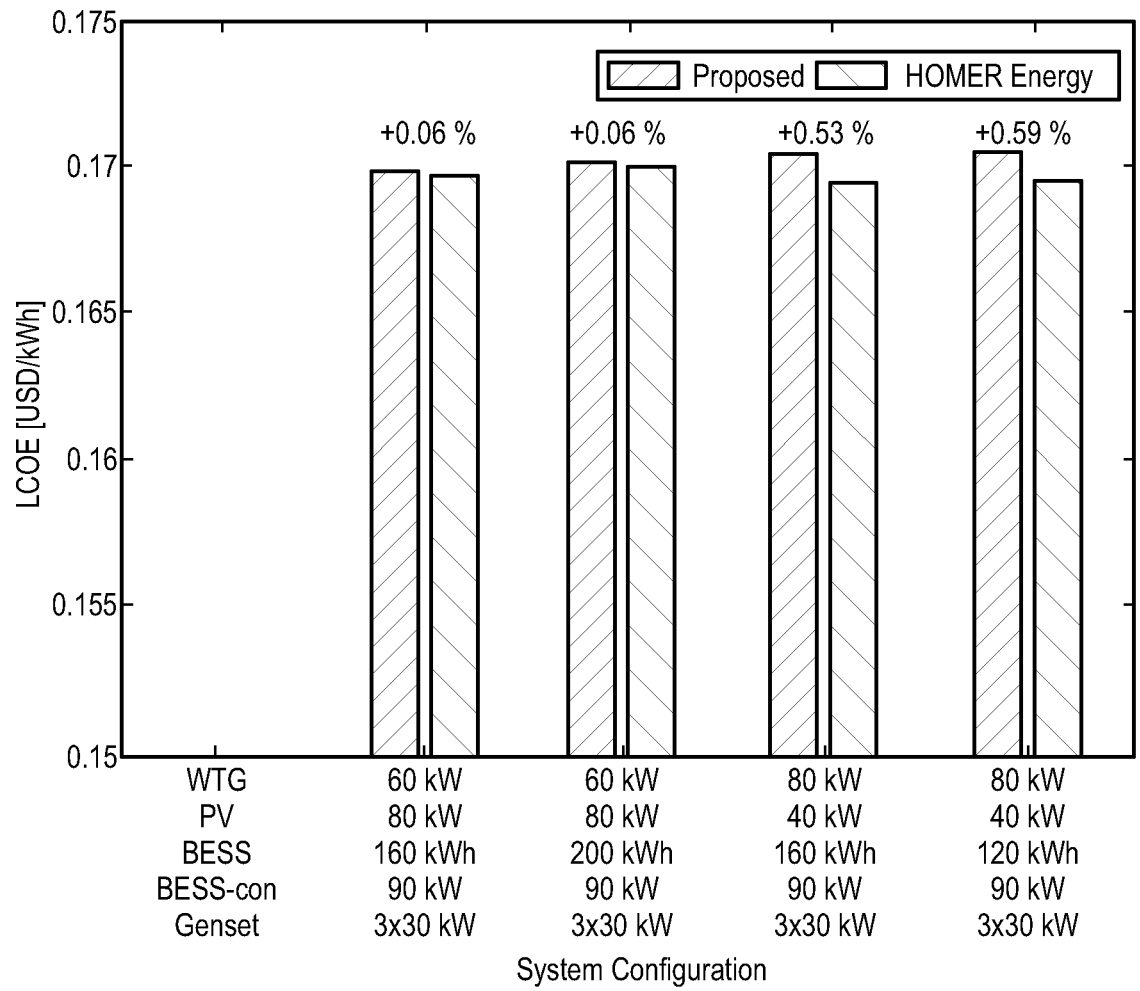
FIG. 9 shows result comparison for the computed system configurations.
Figure 10A:
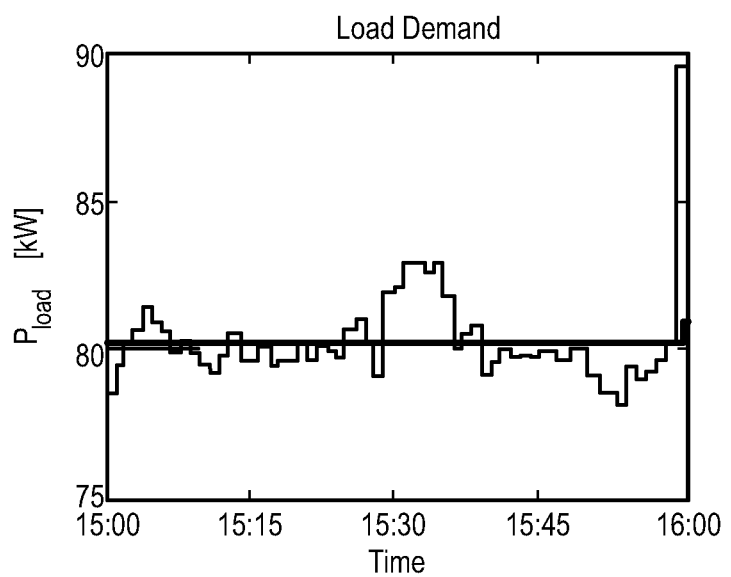
FIGS. 10a-10c show base case: $P_{Load}$, $P_{WTG}$, $P_{PV}$, $P_{GS1}$, $P_{short}$, SOC, for time resolutions of 1 hour and 1 min.
Figure 10A:
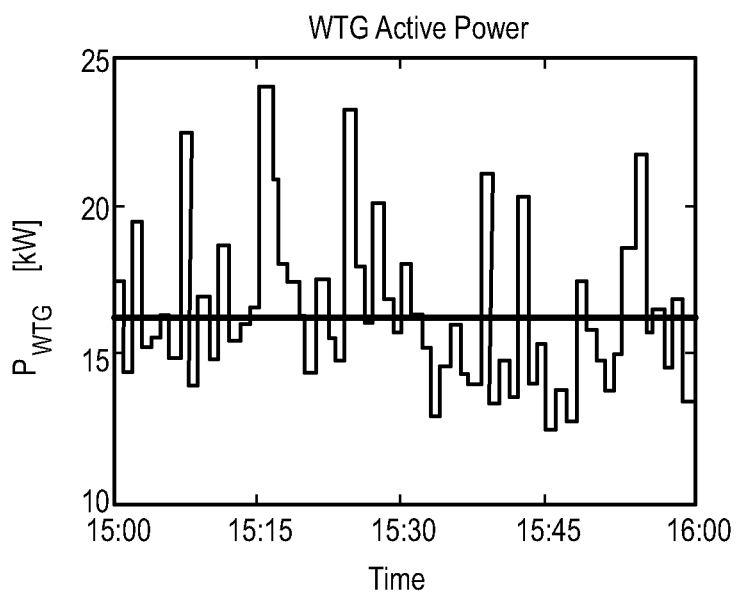
Figure 10B:
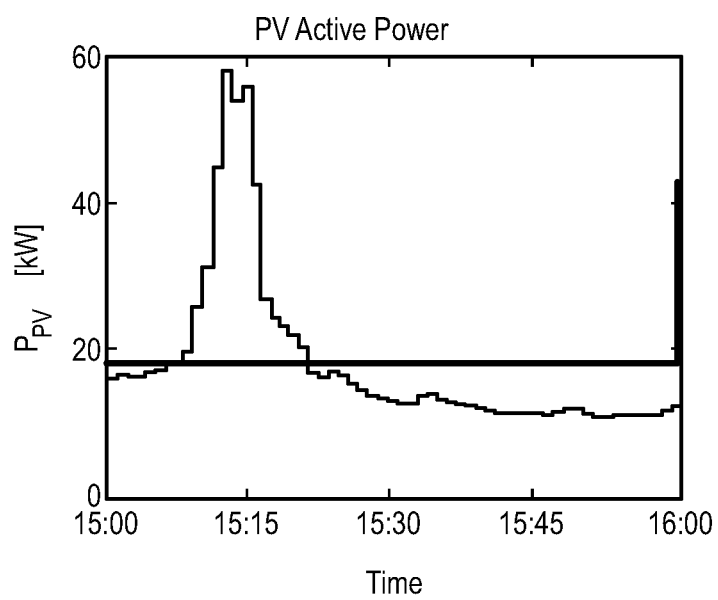
Figure 10B:
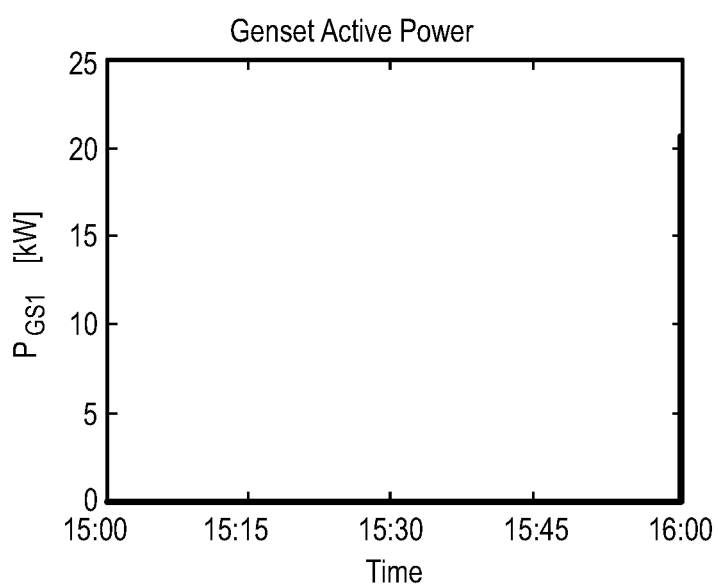
Figure 10C:
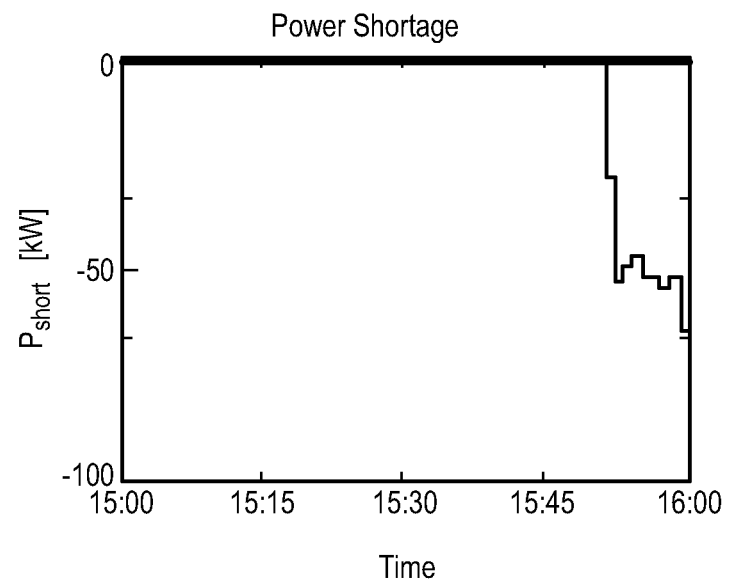
Figure 10C:
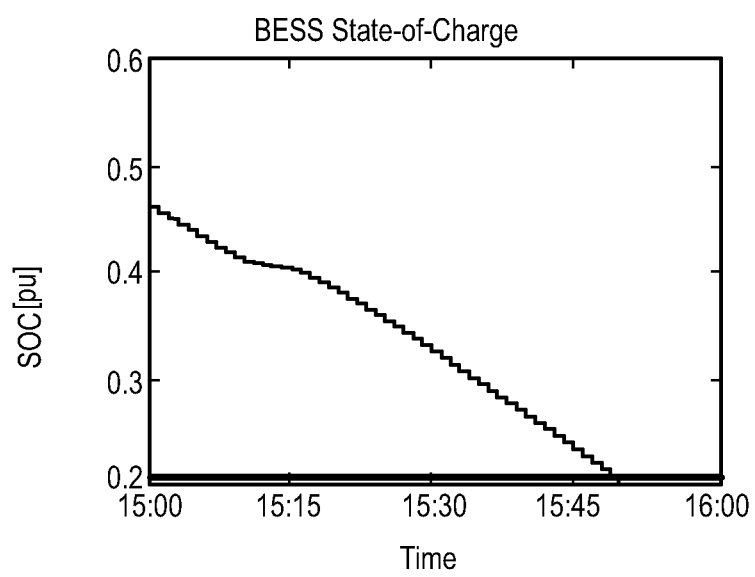

The results of the first four computed system configurations are compared by means of FIG. 9. It is noteworthy that both the proposed method and HOMER Pro® obtain the same configurations, however in different sequence with respect to the lowest LCOE. FIG. 9 shows that the computed values for LCOE are comparable with small errors below 1%, which is within an acceptable range. The measured computational time of the proposed method is around 7 minutes on average, which is acceptable. Hence, the chosen enumeration based approach for solving the optimization problem is satisfactory and more complex evolutionary methods are not required.

V. Assessment Study

In this section, the impact of the resolution of resource data on the ability of the configured HPP to supply the load demand is assessed by evaluating the LPSP criterion. The base case is to use hourly mean data ($\Delta t=1$ h). Higher resolution data sets are available and used during the simulation in order to account for intra-hour power variations:

$\Delta t=10$ min
$\Delta t=5$ min
$\Delta t=1$ min

A. Simulation Results for Base Case

The computed system configuration involving 60 kW WTG subsystem, 80 kW PV, 160 kWh/90 kW BESS and 3×30 kW gensets is the cost optimal solution with an LCOE of 0.1902 $/kWh, simulated with hourly mean values. In this case, the electrical infrastructure of the HPP is taken into account, assuming a distance of 1 km between RES subsystems and PCC. Subsequently, this particular HPP is evaluated for higher time resolutions, however with unaltered production profile of the genset subsystem. Here, the assumption is that unit commitment and power dispatch of diesel generators in smaller time intervals than 1 hour may not be desired in practice due to wear and tear during start ups/shut downs and constantly changing operating points.

The results for the obtained LPSP during the simulations are summarized in Tab. I, where LPSP>0 indicates events of power shortage. It can be remarked that events of power shortage occur for higher time resolutions, which is related to the intra-hour power fluctuations as demonstrated in FIG. 10. Here, relevant time domain profiles are shown for an exemplary hour of the year with present power shortage. At this operating point for $\Delta t=1$ h, the SOC of the BESS is nearly at its minimum level of $SOC_{min}=0.2$. For higher time resolutions the SOC approaches the 1 h mean value at the time of 15.45 h. The WTG and PV production in the next few minutes is highly volatile and predominantly deseeding the hourly average value. Hence, the load demand cannot be fulfilled (power shortage), as the energy capacity of the BESS is drained and the genset will only go into operation at the next full hour (16.00 h).

TABLE I

SIMULATION RESULTS FOR
BASE CASE AND TUNED CASE

| Time resolution $\Delta t$ | 1 h | 10 min | 5 min | 1 min |
|---|---|---|---|---|
| LPSP [%] for Base Case | 0.00 | 2.20 | 1.96 | 1.33 |
| LPSP [%] for Tuned Case | 0.00 | 0.00 | 0.00 | 0.00 |

B. Method Tuning

In order to avoid these power shortage events, sufficient operational power reserve is required. The approach is to provide reserve power by the BESS, as it is the most flexible DER unit in the system due to constant operation and the capability to quickly balance out mismatches between power supply and demand $\Delta P(t)=P_S(t)-P_{PL}(t)$. Presently, the operating interval for the BESS is defined between $0.2<SOC<0.8$. On the one hand, reducing the maximum limit $SOC_{max}$ can account for positive $\Delta P(t)$. This, however will reduce the long-term charging capability being required for storing excess power production of RES throughout the day. A more economical way of dealing with short-term overproduction is RES curtailment. On the other hand, increasing the minimum limit $SOC_{min}$ can ensure sufficient power supply during negative $\Delta P(t)$. The required operational reserve is determined based on statistical analysis carried out in the following sequence:

Calculate the vectors for remaining power to be supplied after delivering WTG and PV power as per Eq. 25, for $\Delta t=1$ h and $\Delta t=1$ min.

$$P_{rem,\Delta t}=P_{PL,\Delta t}-P_{WTG,\Delta t}-P_{PV,\Delta t} \quad (25)$$

Determine the vector for positive power mismatch as per Eq. 26.

$$dP=P_{rem,1\ min}-P_{rem,1\ h}\{dP>0\} \quad (26)$$

Figure 11:
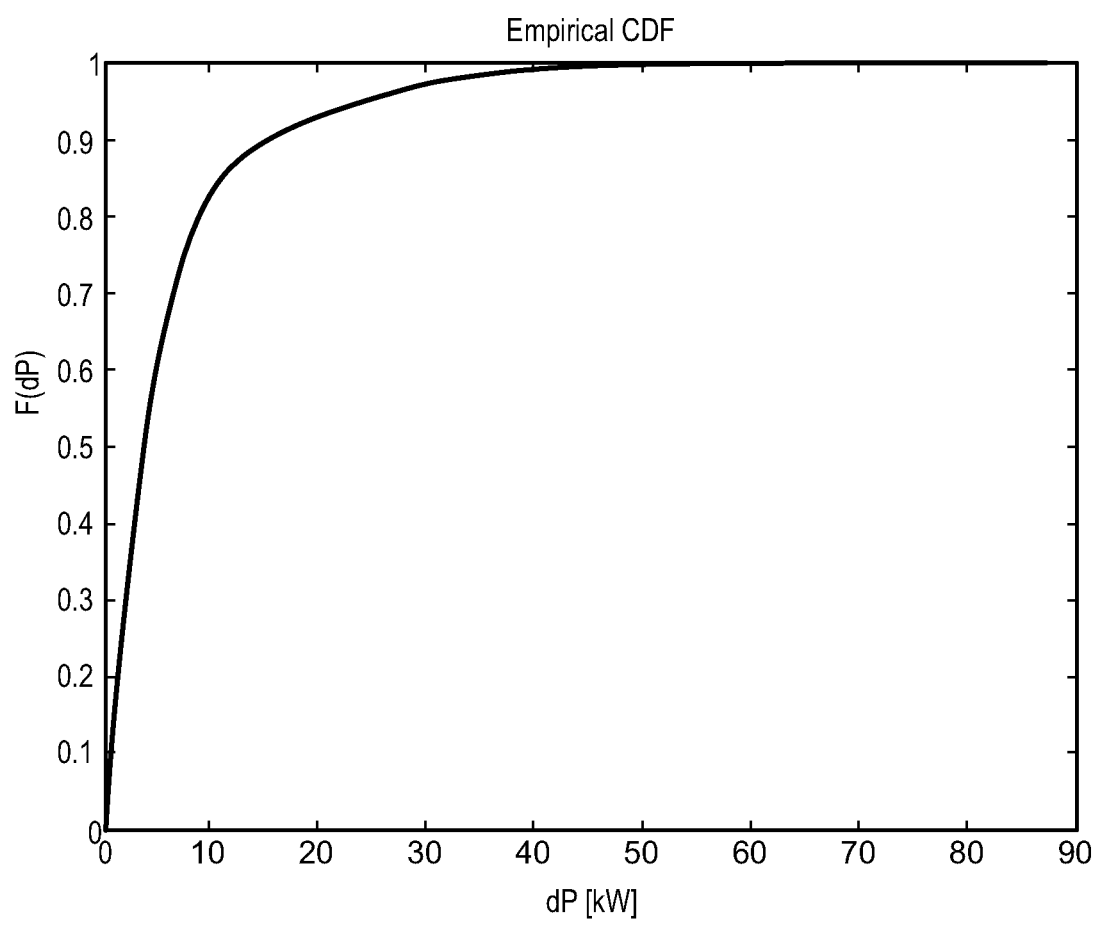
FIG. 11 shows Empirical Cumulative Distribution for vector dP.
Figure 12A:
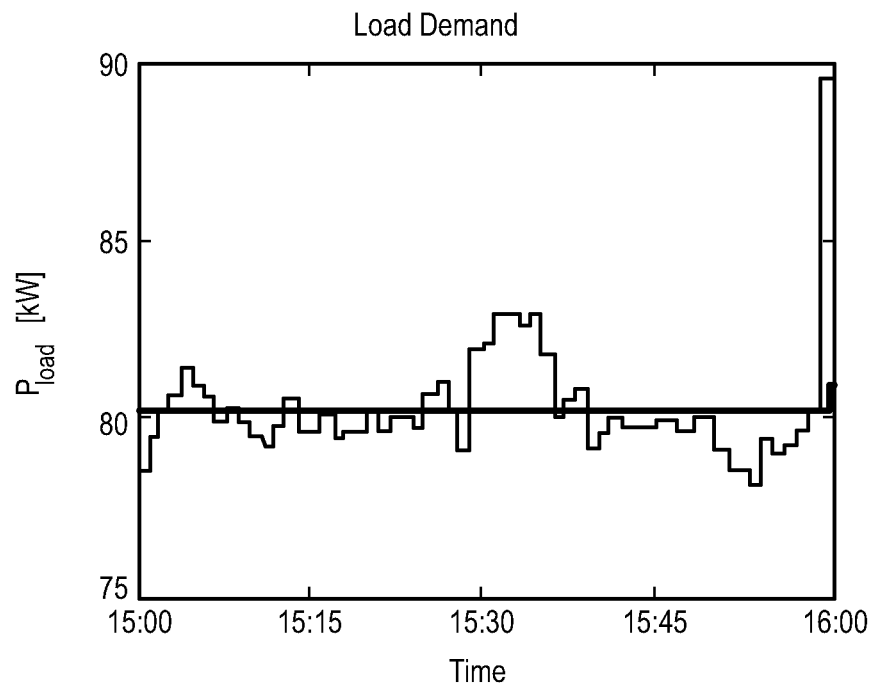
FIGS. 12a-12c shows tuned case: $P_{Load}$, $P_{WTG}$, $P_{PV}$, $P_{GS1}$, $P_{short}$, SOC, for time resolutions of 1 hour and 1 min.
Figure 12A:
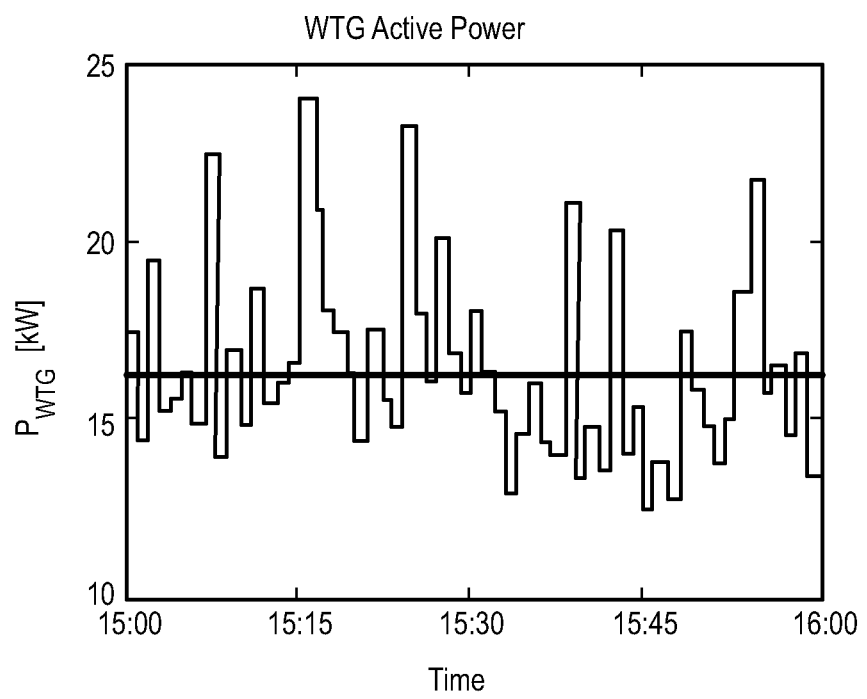
Figure 12B:
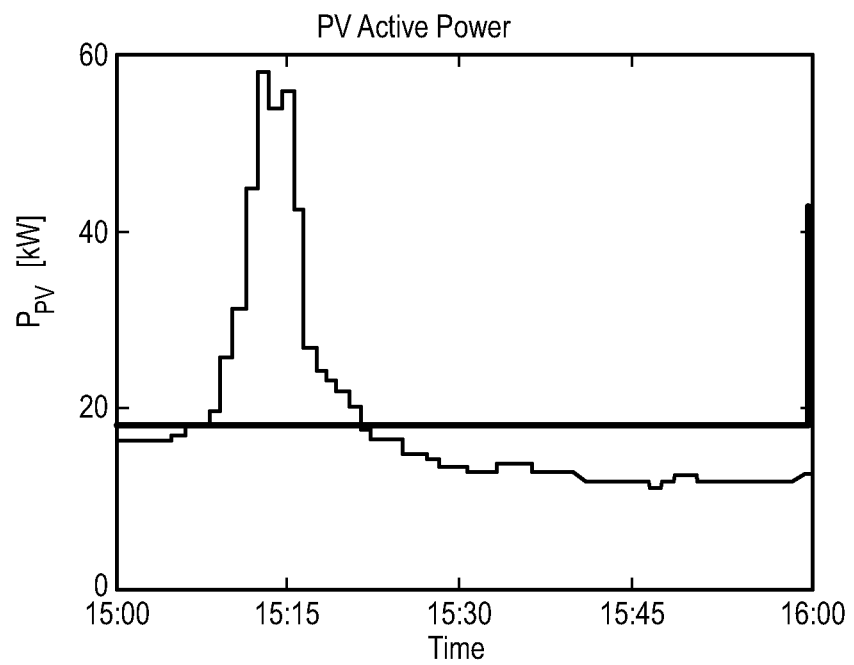
Figure 12B:
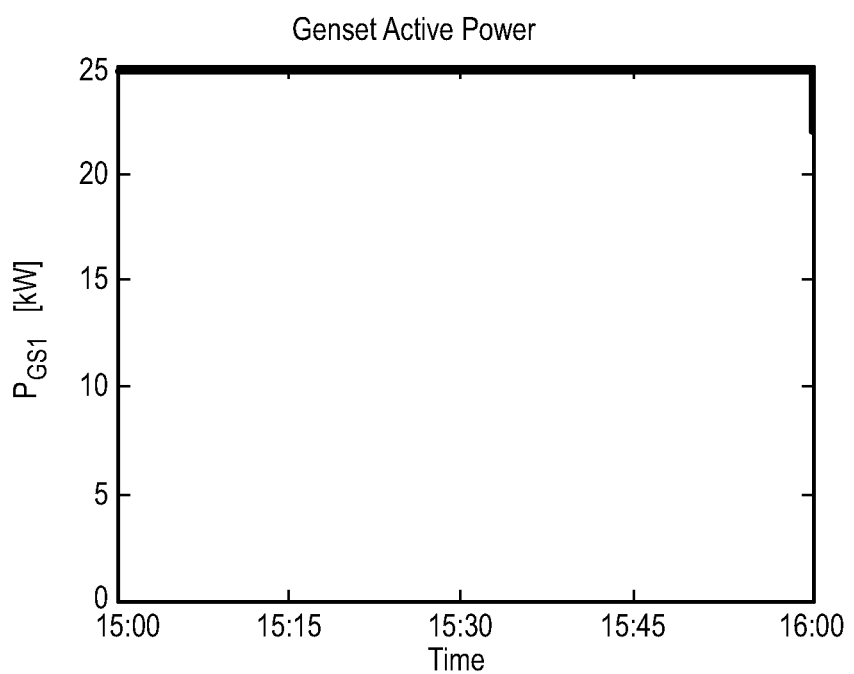
Figure 12C:
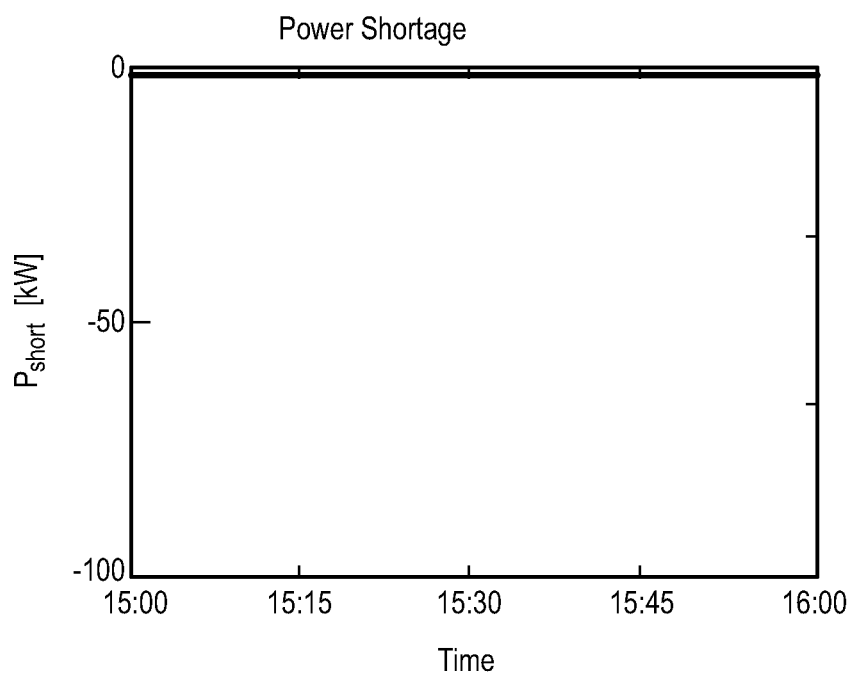
Figure 12C:
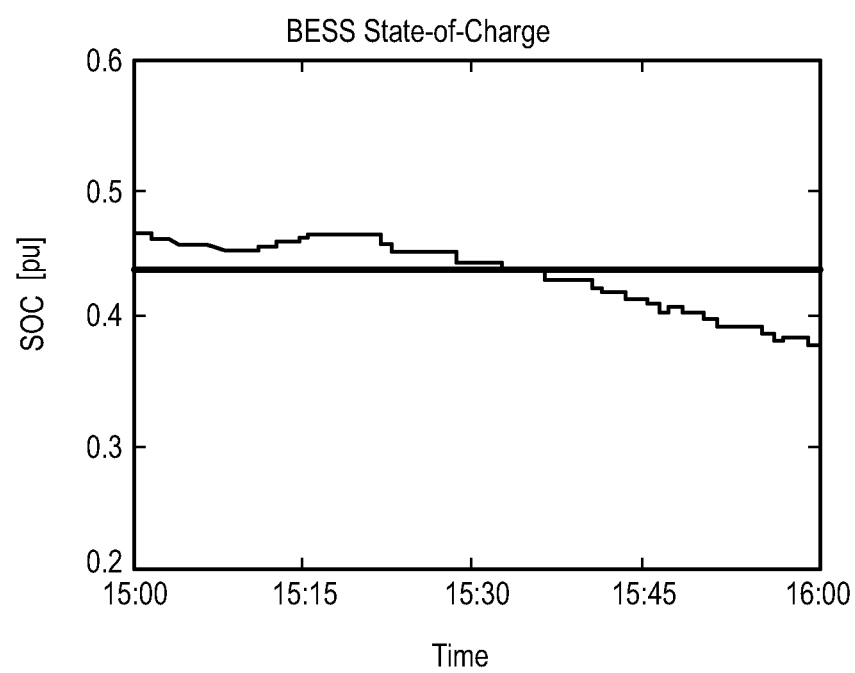

Calculate the power reserve $dP_{99\%}$, required for 1 hour time interval in 99% of the cases, based on the empirical cumulative distribution expressed by Eq. 27 and shown in FIG. 11.

$$F(dP_{99\%})=0.99 \quad (27)$$

Determine the updated minimum SOC limit as per Eq. 28.

$$SOC_{min,1h} = 0.2 + \frac{dP_{99\%} \cdot 1h}{E_{BESS,rat}} \quad (28)$$

C. Simulation Results for Tuned Case

The hourly based simulation for the computed system configuration is repeated by using the updated SOC limit $SOC_{min,1\ h}=0.44$. Compared to the untuned case, the unit commitment and power dispatch profile of the genset subsystem is altered due to the reduced available capacity of the BESS. This leads to an increased LCOE of 0.2020 $/kWh (+6%). Subsequently, the system configuration is evaluated for higher time resolutions, however with default SOC limit of $SOC_{min}=0.2$. FIG. 12 depicts the results for the time domain profiles of the same operating point as shown in FIG. 10. In this case, the genset is already in operation at time 15.00 h, as the updated SOC limit has been deseeded. Hence, the BESS is able to balance the intra-hour power variations, since sufficient energy capacity is available before reaching the absolute minimum SOC. No power shortage events are observed during the simulations as stated in Tab. I. Hence, the developed tuning process for the method is valid in order for the configured HPP to supply the load demand in every minute of the year.

VI. Summary and Recommendations

According to the present invention a methodology to determine feasible system configurations of modular and scalable wind integrated HPP solutions for off-grid applications has been provided. In the first step, the composition of various components and the electrical infrastructure is defined to enable modularity and scalability of the HPP. The described balance of plant allows an installed RES capacity of up to 900 kW, being sited with a maximum distance of 4 km towards the PCC of the HPP. Upscaling towards multi-MW scale HPPs requires an enhanced voltage level for the MV lines between RES subsystem and PCC to account for power losses and the permitted voltage drops.

Subsequently, the assumptions for modelling the different components of the HPP are exposed. The loads, WTG, PV, BESS and genset subsystem are modelled from a technical and economical perspective according to the purpose of the present invention. The physical models have low bandwidth to simply represent active and reactive power flow on minute scale.

Finally, the optimization method according to the present invention for sizing the HPP has been explained in detail. The enumeration-based single-objective approach is divided in three stages, i.e. initialization, simulation and post-processing, being described by means of a flow diagram. One key development is obtained by intelligent definition of the search space during the system initialization in order to reduce the computational time of the simulation. The simulation itself considers supply of both active and reactive power demand and takes into account the power losses within the HPP. The validation process shows that the sizing method is performing in accordance with the benchmark tool in HOMER Pro® with low validation errors.

The assessment study shows that it is necessary to provide certain amount of operational reserve to account for the intra-hourly power fluctuations due to changes in wind speed, solar irradiation and load demand. A methodology based on statistical data analysis is proposed for the BESS to provide power reserve by specifying an enhanced value for the minimum SOC. Future advancements of the proposed configuration method shall be approached to account for very short-term dynamics on subsecond scale which are relevant for voltage and frequency stability within the HPP. Additional active and reactive power reserve may be required by the DERs in order to balance out voltage and frequency variations. This in turn can have an impact on the component sizing. In the present invention, the considerations concerning operational scheduling are based on the assumption that all resources are known by means of deterministic profiles. However, in practice the available renewable power generation as well as load consumption needs to be predicted in order to optimally dispatch BESS and gensets.

Upscaling towards multi-MW scale does not necessarily have an impact on the sizing method. As diesel generators for off-grid systems can be up to 10 MW, it allows upscaling towards a maximum generation capacity of 30 MW without necessary advancements of the operational strategies. However, a high number of units are required for large-scale projects with 50+ up to hundreds of MW installed capacity. In this case, the genset subsystem will impose challenges due to the complexity of parallel genset operation. Here, the operational strategies need to account for more complex methods to ensure cost optimized load sharing between multiple gensets. Additionally, in the presence of large fixed speed motor loads, special attention needs to be paid to the active and reactive power rating of the DERs in order to cope with high inrush currents during start up and the increased reactive power demand of highly inductive loads.

The invention claimed is:
1. A hybrid power plant, comprising:
a plurality of power units being operatively connected to an internal power grid, wherein respective power ratings of the plurality of power units of the hybrid power plant are determined based on active and reactive power losses in the internal power grid, wherein the respective power ratings of the plurality of power units reduce the active and reactive power losses;
a first voltage bus connected to a first subset of the plurality of power units; and
a second voltage bus connected to a second subset of the plurality of power units and the first voltage bus via a substation transformer, wherein a voltage of the second voltage bus reduces power losses and voltage drops in the internal power grid for power generated by the second subset of the plurality of power units.

2. A hybrid power plant according to claim 1, wherein the first voltage bus comprises a low-voltage bus, and wherein the second voltage bus comprises a medium-voltage bus, said medium-voltage bus being operatively connected to the low-voltage bus via one or more transformer units.

3. A hybrid power plant according to claim 2, wherein the plurality of power units are selected from the group consisting of: wind turbine generators, photovoltaic systems, energy storage systems and engine driven generators.

4. A hybrid power plant according to claim 3, wherein one or more wind turbine generators and/or one or more photovoltaic systems are operationally connected to one or more medium-voltage buses via respective transformer units.

5. A hybrid power plant according to claim 3, wherein one or more energy storage systems and/or one or more engine driven generators are operationally connected to one or more low-voltage buses and/or one or more medium-voltage buses.

6. A hybrid power plant according to claim 1, wherein the total power rating of the plurality of power units is below 5 MW.

7. A method for determining power ratings of a plurality of power units being operatively connected to an internal power grid of a hybrid power plant, the method, comprising:
determining respective power ratings of the plurality of power unit based on active and reactive power losses in the internal power grid, wherein the respective power ratings of the plurality of power units reduce the active and reactive power losses, wherein the internal power grid comprises:
a first voltage bus connected to a first subset of the plurality of power units; and
a second voltage bus connected to a second subset of the plurality of power units and the first voltage bus via a substation transformer, wherein a voltage of the second voltage bus reduces power losses and voltage drops in the internal power grid for power generated by the second subset of the plurality of power units.

8. A hybrid power plant according to claim 6, wherein the total power rating of the plurality of power units is below 2 MW.

9. A method according to claim 7, wherein the first voltage bus comprises a low-voltage bus, and wherein the second voltage bus comprises a medium-voltage bus, said medium-voltage bus being operatively connected to the low-voltage bus via one or more transformer units.

10. A method according to claim 9, wherein the plurality of power units are selected from the group consisting of: wind turbine generators, photovoltaic systems, energy storage systems and engine driven generators.

11. A method according to claim 10, wherein one or more wind turbine generators and/or one or more photovoltaic systems are operationally connected to one or more medium-voltage buses via respective transformer units.

12. A method according to claim 10, wherein one or more energy storage systems and/or one or more engine driven generators are operationally connected to one or more low-voltage buses and/or one or more medium-voltage buses.

13. A method according to claim 7, wherein the determined total power rating of the plurality of power units is below 5 MW, such as below 4 MW, such as below 3 MW, such as below 2 MW, such as below 1.5 MW, such as below 1 MW.

14. A hybrid power plant, comprising:
a plurality of power units being operatively connected to an internal power grid, wherein respective power ratings of the plurality of power units of the hybrid power plant are determined based on active and reactive power losses in the internal power grid,
wherein the respective power ratings of the plurality of power units reduce the active and reactive power losses;
wherein the internal power grid comprises a first voltage bus connected to a first subset of the plurality of power units and a second voltage bus connected to a second subset of the plurality of power units;
wherein the first voltage bus is configured for a lower voltage than the second voltage bus, the second voltage bus being operatively connected to the first voltage bus via one or more substation transformer units,
wherein a voltage of the second voltage bus reduces power losses and voltage drops in the internal power grid for power generated by the second subset of the plurality of power units,
wherein the total power rating of the plurality of power units is below 5 MW.

15. A hybrid power plant according to claim 14,
wherein the plurality of power units are selected from the group consisting of: one or more energy storage systems and one or more engine driven generators; and
wherein at least one of the one or more energy storage systems or the one or more engine driven generators are operationally connected to the second voltage bus.

16. A hybrid power plant according to claim 14, wherein the plurality of power units are selected from the group consisting of: wind turbine generators and photovoltaic systems.

17. A hybrid power plant according to claim 16, wherein at least one of one or more wind turbine generators or one or more photovoltaic systems are operationally connected to the second voltage bus via respective transformer units.

18. A hybrid power plant according to claim 17, wherein the total power rating of the plurality of power units is below 2 MW.

* * * * *